United States Patent [19]

Ohno

[11] 4,057,695
[45] Nov. 8, 1977

[54] TELECOMMUNICATION SYSTEM WITH CONTROLLED GAIN ACTIVE FILTERS

[75] Inventor: Toru Ohno, Yokohama, Japan

[73] Assignee: Hitachi, Ltd., Japan

[21] Appl. No.: 685,809

[22] Filed: May 12, 1976

[30] Foreign Application Priority Data

May 14, 1975 Japan .................................... 50-56067

[51] Int. Cl.² .............................................. H04B 3/36
[52] U.S. Cl. .................. 179/170 R; 179/16 F
[58] Field of Search ............ 179/18 EA, 16 F, 170 R, 179/15 BF, 15 BL, 170 T

[56] References Cited

U.S. PATENT DOCUMENTS

| | | | |
|---|---|---|---|
| 3,251,946 | 5/1966 | Pfleiderer et al. | 179/170 R |
| 3,689,704 | 9/1972 | Wadding | 179/16 F |
| 3,781,481 | 12/1973 | Shaffer et al. | 179/16 F |
| 3,806,658 | 4/1974 | Anderson et al. | 179/16 F |
| 3,816,668 | 6/1974 | Giesken | 179/16 F |
| 3,829,626 | 8/1974 | Irwin et al. | 179/170 R |
| 4,007,340 | 2/1977 | Russell | 179/16 F |

FOREIGN PATENT DOCUMENTS 1,287,650  10/1966  Germany ........................... 179/16 F

*Primary Examiner*—Kathleen H. Claffy
*Assistant Examiner*—Randall P. Myers
*Attorney, Agent, or Firm*—Craig & Antonelli

[57] ABSTRACT

A telecommunication system includes a plurality of information transmission lines of various length, through which information signals are transmitted, active filters coupled to the information transmission lines, and a switching network coupled with the lines through the active filters, for establishing various connections between the lines in response to subscriber connection requirements. The active filters are of the type whose gain can be controlled and the gain is controlled in response to the length of the line over which the signals are transmitted, whereby the transmission loss of the line is compensated.

6 Claims, 3 Drawing Figures

TELECOMMUNICATION SYSTEM WITH CONTROLLED GAIN ACTIVE FILTERS

BACKGROUND OF THE INVENTION

The present invention relates in general to a telecommunication system including a central exchange, and more particularly, to a telecommunication system in which the transmission loss of a transmission line associated with the central exchange is compensated.

A telecommunication system is generally made up of a communication network covering a large area, in which information transmission lines, such as subscriber's lines interconnecting subscribers and telephone central offices, and trunks coupling the telephone central offices, are provided.

The information transmission lines of the telecommunication system are required to have certain transmission characteristics in order to prevent deterioration of the transmission signals carried thereby. Therefore, in the case where the information transmission lines extend over a long distance and the transmission loss thereof exceeds a certain permissible transmission loss, 5 dB for instance, a gain compensating apparatus, such as a negative impedance repeater, and end repeater and a range extender is provided at the information transmission line to compensate the transmission loss. It is, however, costly and therefore uneconomical to provide such gain compensating apparatus at the respective information transmission lines.

SUMMARY OF THE INVENTION

An object of this invention is to provide a telecommunication system which can compensate easily the transmission loss of information transmission lines therein.

Another object of this invention is to provide a telecommunication system, in which the transmission loss of transmission lines is compensated by the gain control of active filters connected to the lines.

More specifically, a time division communication system has been proposed in which low pass filters are utilized as standard equipment to modulate and demodulate voice signals on the lines without distortion. Common LC filters have been used as these low pass filters in the conventional system. It is now possible, however, to substitute an active filter for the LC filter previously used as a result of the progress which has been made in semiconductor techniques. Therefore, in order to achieve the above objects, the telecommunication system of this invention provides active filters in association with the system transmission lines, through which the information transmission lines are coupled with a switching network. In accordance with this invention, the gain of the active filter is controlled in response to information from the transmission line, whereby the transmission loss of the transmission line is compensated regardless of the length thereof.

The principle of this invention is not restricted to telephone systems, but is also applicable to data communication systems in general.

The above and other objects and advantages of this invention will become more apparent from the following detailed description in connection with the accompanying drawing.

DESCRIPTION OF THE PREFERRED EMBODIMENT

Figure 1:
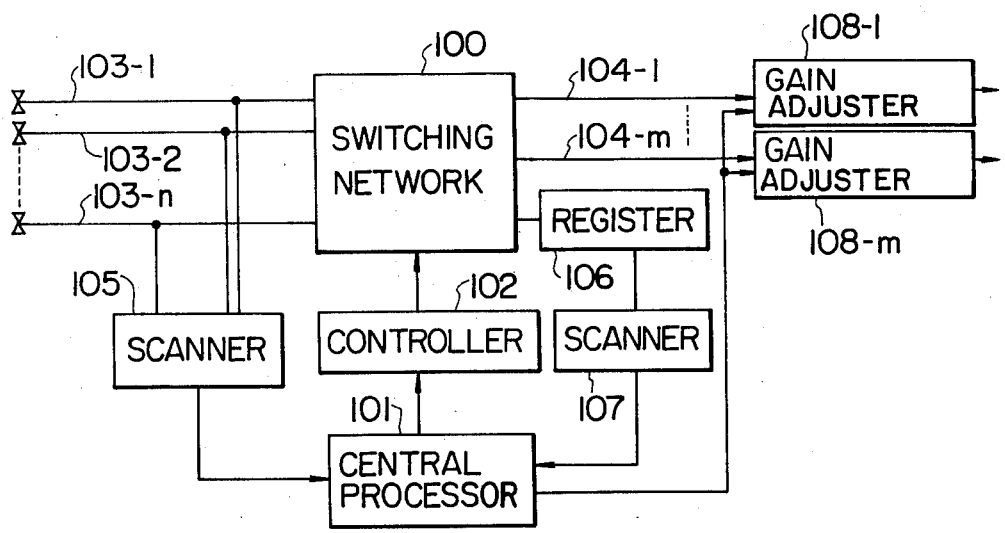
FIG. 1 is a schematic block diagram of an exemplary embodiment of this invention.

FIG. 1 shows an embodiment of the present invention as applied to a time division telephone system, in which a switching network 100 is coupled with a central processor 101 through a controller 102. The switching network 100, as well known, provides a connection between selected subscriber's lines 103-1, 103-2, . . . 103-n or between one of these lines and a selected one of the outgoing trunks 104-1, . . . 104-m extending to other central offices under the control of the controller 102.

In the conventional operation of such a system, a scanner 105 observes off-hook conditions of the subscriber's lines 103-1 through 103-n by scanning these lines with a period of 200 m sec., for instance. Now, when a subscriber telephone receiver goes off-hook, the so-called T and R lines of the subscriber's line are connected to form a loop through which a current flows. The scanner 105 detects this line current, identifies the line which has gone off-hook, and forwards to the central processor 101 the identity of the subscriber's line which is in the off-hook condition. As a result, the central processor 101 actuates the switching network 100 using conventional path finding techniques to connect the subscriber's line to a dial-tone trunk which may be formed as part of the register 106, whereby dial tone is returned to an originating subscriber.

At this time, the central processor awaits the dialed number of the called subscriber, which is received and stored in the register 106, the content of which is read out through a scanner 107 by the central processor 101. When the central processor 101 receives the dialed number of the called subscriber, ringing tone is sent out to the called subscriber. Then, the originating subscriber's line and the called subscriber's line are connected through the switching network 100 under control of the central processor 101 when the called subscriber picks up his telephone receiver.

In this case, if the originating and the called subscribers are in the same exchange area and are therefore connected to the same central office, their lines can be directly connected by the switching network 100 under the control of the central processor 101. However, if the called subscriber belongs to the exchange area of another telephone central office, this will be determined by the central processor 101 upon receipt of the first dialed digits and the switching network 100 will be controlled to connect the originating subscriber's line through one of the trunks 104-1 to 104-m which extends to the telephone central office with which the called subscriber is associated.

Now, as already described, gain compensating apparatus has been provided previously at the subscriber's lines and the trunks to compensate for the transmission loss thereof, the provision of which equipment is uneconomical. Further, there are, in general, several tens of thousands of subscriber's lines in the typical telephone central office; whereas, the number of trunks for connections to the other telephone central offices usually is limited to several hundred trunks, for instance. Therefore, the trunks are variously associated with each of the various subscriber's lines as a speech path is established to other central offices. In such a case, it is necessary to adjust the transmission gain of the trunk, generally, an information line, in response to the particular subscriber's line to which the information line is connected, since the subscriber's lines extend over various distances so that the transmission loss of the respective lines is different from each other. For this purpose, gain adjusters 108-1 to 108-m shown in FIG. 1 are placed in the trunks 104-1 to 104-m, respectively, the gains of which are controlled by the central processor 101. Namely, information for the gain control of the gain adjusters 108-1 to 108-m is previously stored in a memory (not shown) of the central processor 101. The information may be of a selection of the gain for the gain controller in accordance with the particular line involved.

The control of the gain adjusters 108-1 to 108-m is carried on as follows. The central processor 101 detects through the scanner 105 the identity of the originating subscriber's line, whereby the gain to be compensated is determined. On the other hand, the central processor 101 detects the called subscriber from the contents of the register 106, on the basis of which information the necessary trunk, for instance, the trunk 104-1, is selected. As a result, the gain of the gain adjuster 108-1 is so controlled that the transmission loss of the originating subscriber's line is compensated.

Figure 2:
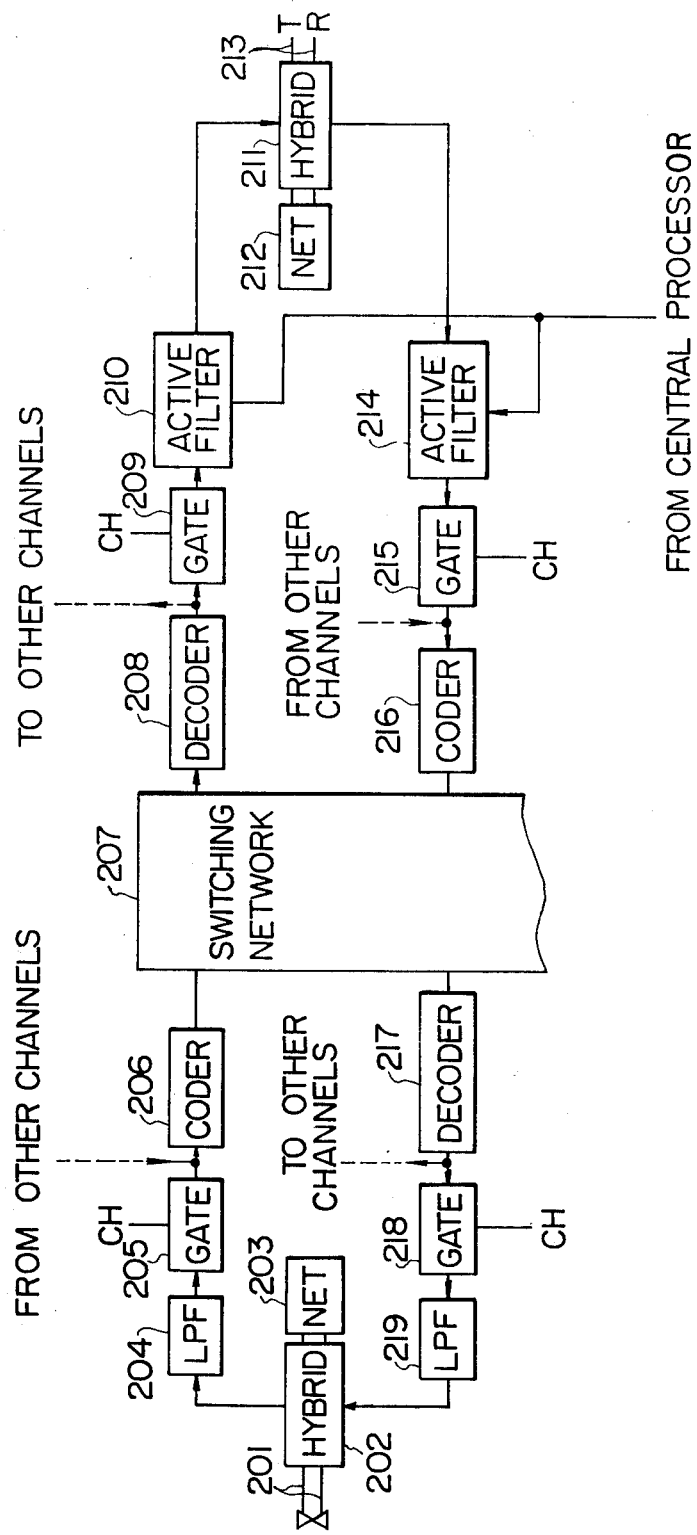
FIG. 2 is a more detailed block diagram of a portion of the embodiment of FIG. 1.

The embodiment of this invention will be explained in more detail referring to FIG. 2, in which only one subscriber's line and only one trunk are illustrated. In FIG. 2, a two-wire voice frequency line 201 is connected to a hybrid network 202 which is terminated by a suitable balancing network 203. Transmission beyond the hybrid network 202 is performed with the two directions of transmission separated by the conjugation of the hybrid network 202. The transmitting path from hybrid network 202 takes the form of a low-pass filter 204, a channel sampling gate 205 and a pulse code modulation coder 206 coupled to a switching network 207. Low-pass filter 204 serves to limit the top frequencies of the transmitted voice-frequency messages to 4 KHz, for instance, and gate 205 is enabled by a so-called channel time slot pulse at a 8 KHz rate. The channel pulses assigned to each channel are displaced in time from all other channel pulses, with the result that the input applied to coder 206 is a time-division multiplexed sequence of samples from all of the channels being transmitted. Samples from the other channels are interleaved with those from gate 205 at the input of coder 206. Coder 206, the construction of which is well known, converts the voice-frequency messages into multiplexed binary code groups, that is, pulse code modulation signals.

Next, the pulse code modulation signals from coder 206 are applied to a decoder 208 as a result of the switching action of switching network 207, as has been described above. Decoder 208, the construction of which is well known, converts the pulse code modulation signals to analog signals. The output of decoder 208 is distributed to each of the receiving channels. In the illustrated receiving channel, the output of decoder 208 is connected through a channel gate 209 and an active filter 210 to a hybrid network 211. The channel time slot pulses of the channel concerned are applied to channel gate 209 to separate the message samples of this channel from those of the others. Active filter 210, which is a type of lowpass filter capable of gain control, as will be explained later, removes the high-frequency components from the message samples for this particular channel and restores the message to its original form. The gain of active filter 210 is controlled by the central processor 101 in accordance with the identity of the subscriber's line coupled thereto, for which the transmission loss is unique. Hybrid 211 is terminated by a balancing network 212. To the right of hybrid network 211, the message is transmitted through a transmission line 213.

The pulse code modulation equipment in the direction from transmission line 213 to switching network 207, with the exception of active filter 214, is substantially the same as that used for transmission in the opposite direction, as has already been described. An active filter 214, the gain of which is controlled in the same manner as that of active filter 210 by the central processor 101, is connected to hybrid network 211 and is isolated from filter 210 in the receiving path by the conjugation of hybrid network 211. Beyond filter 214 in the transmitting path are a channel gate 215 and a pulse code modulation coder 216. Other channels are multiplexed for transmission at the input side of coder 216. The output of coder 216 is connected to the subscriber's line through switching network 207.

The pulse code modulation message transmission path is completed at the subscriber's line by a decoder 217 connected to hybrid network 202 through the series combination of a channel gate 218 and a low-pass filter 219. Decoder 217 and gate 218 are substantially identical to decoder 208 and gate 209. Low-pass filter 219 serves to remove the high-frequency components from the message samples.

Figure 3:
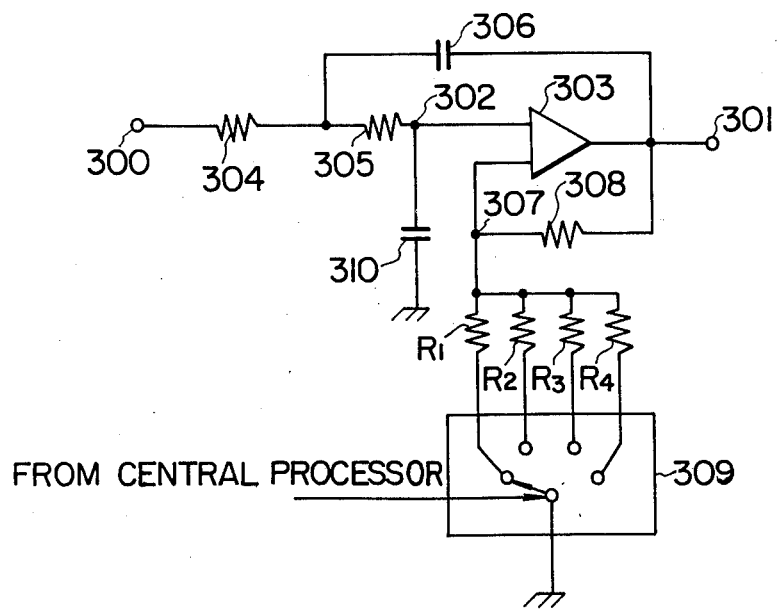
FIG. 3 is a circuit diagram of a portion of the block diagram of FIG. 2.

The details of the active filter will be explained here in connection with FIG. 3. In FIG. 3 input and output terminals 300 and 301 are coupled, for example, to gate 209 and hybrid network 211, respectively. Terminal 300 is connected to one input terminal 302 of an operational amplifier 303 through resistors 304 and 305 in series, the configuration of operational amplifier 303 being well known. The output of operational amplifier 303 is fed back to the input thereof through a condenser 306. On the other hand, the output of the operational amplifier 303 is also fed back to the other input terminal 307 of the amplifier through a resistor 308, to which one commonly connected end of each of the resistors $R_1$, $R_2$, $R_3$ and $R_4$ is connected. The other ends of resistors $R_1$ through $R_4$ are selectively grounded through a switch 309 which is controlled by the output of the central processor 101, whereby the gain of the opertional amplifier 303 is controlled.

The gain K of the operational amplifier 303 is represented by the following formula:

$$K = 1 + (R_F)/(R_G)$$

where, $R_F$ is the resistance value of resistor 308 and $R_G$ is the resistance value of the selected resistor connected between input terminal 307 and ground. Therefore, the gain of operational amplifier 303 is changed by the selection of the resistor connected between terminal 307 and ground since the resistance values of resistors $R_1$ to $R_4$ are different from one another.

In this embodiment, four resistors $R_1$ to $R_4$ are illustrated, but the present invention is not limited to this arrangement and the required resistors are provided in the required number to compensate the transmission loss of the information line over a desired range. Further, although the above description is directed to the case where the gain controllers are provided at the trunks coupled between the telephone offices, the principle of this invention is, or course, applicable to information lines, such as subscriber's lines and data lines, to which the information signals from different characteristic information lines are applied.

While only a few forms of the present invention have been shown and described, many modifications will be apparent to those skilled in the art within the spirit and scope of the invention as set forth in the appended claims.

What is claimed is:

1. A telecommunication system comprising:
   a first pulse code modulation coder for converting voice-frequency signals into pulse code modulation signals;
   a time division multiplex pulse code modulation switching network having one side thereof connected to said coder and switching said pulse code modulation signals from said coder through the network to the opposite side thereof;
   a first pulse code modulation decoder connected to said one side of said switching network and converting pulse code modulation signals switched through said network from the opposite side thereof into voice-frequency signals;
   a plurality of transmission lines over which voice-frequency signals are transmitted;
   a plurality of respective active filters coupling the output of said first decoder and the input of said first coder to said transmission lines;
   a plurality of subscriber's lines connected with the opposite side of said switching network, through a second pulse code modulation decoder and a second pulse code modulation coder, respectively; and
   central processing means, connected with said plurality of subscriber's lines and said switching network, for effecting selective connections through said network, between said subscriber's lines and said transmission lines, and being connected to said active filters for controlling the gain of each of said respective active filters in accordance with characteristics of said subscriber's lines.

2. A telecommunication system according to claim 1, wherein each active filter comprises an operational amplifier having a feedback circuit and means for varying the signal level of said feedback circuit.

3. A telecommunication system according to claim 2, wherein said feedback circuit is formed of a plurality of resistors, each having a different value of resistance, and said means for controlling the gain of said active filter includes switch means, responsive to a control signal from said central processor, for connecting a selected one of said resistors between one input of said amplifier and a source of reference potential.

4. A telecommunication system comprising:
   a first pulse code modulation coder connected with a plurality of subscriber's lines for converting voice-frequency signals from said plurality of said subscriber's lines into pulse code modulation signals;
   a time division multiplex pulse code modulation switching network having a first input connected to the output of said first coder and controllably switching said pulse code modulation signals from said coder through the network to a first output thereof;
   a first pulse code modulation decoder connected to said first output of said switching network and converting pulse code modulation signals switched through said network from the first input to the first output thereof into voice-frequency signals;
   a plurality of first gain controllable low-pass active filter means, connected to the output of said first decoder, for removing high-frequency components from and for controllably attenuating the voice-frequency signals from said first decoder;
   a plurality of transmission lines coupled to the respective outputs of said plurality of first filter means;
   a plurality of second gain controllable low-pass active filter means, respectively coupled to said plurality of transmission lines, for removing high-frequency components from and for controllably attenuating voice-frequency signals received from said transmission lines;
   a second pulse code modulation coder connected to the outputs of said plurality of second filter means for converting the gain controlled and filtered voice-frequency signals therefrom into pulse code modulation signals, the output of said second coder being connected to a second input of said switching network so as to be controllably switched therethrough to a second output of said switching network;
   a second pulse code modulation decoder connected to the second output of said switching network and converting pulse code modulation signals switched through the network from the second input to the second output thereof into voice-frequency signals, the output of said second decoder being coupled to said plurality of subscriber's lines; and
   central processing means, connected with said plurality of subscriber's lines and said switching network, for controlling the connection and transmission of pulse code modulation signals through said network, and being further connected to said pluralities of first and second filter means, for controlling the gain of each respective filter means in accordance with characteristics of the respective subscriber's lines.

5. A telecommunication system according to claim 4, wherein each filter means comprises an active filter formed of an operational amplifier having a feedback circuit and means for varying the signal level of said feedback circuit.

6. A telecommunication system according to claim 5, wherein said feedback circuit is formed of a plurality of resistors, each having a different value of resistance, and said means for controlling the gain of said active filter includes switch means, responsive to a control signal from said central processor, for connected a selected one of said resistors between one input of said amplifier and a source of reference potential.

* * * * *